April 13, 1926. 1,580,980
J. H. WAGENHORST
DEMOUNTABLE RIM WITH DETACHABLE RING
Filed August 20, 1924
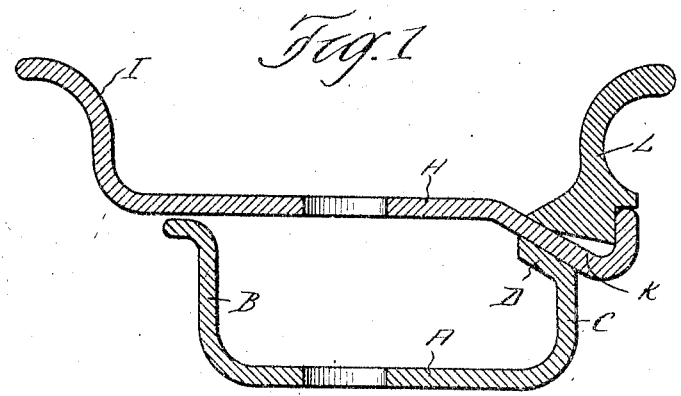
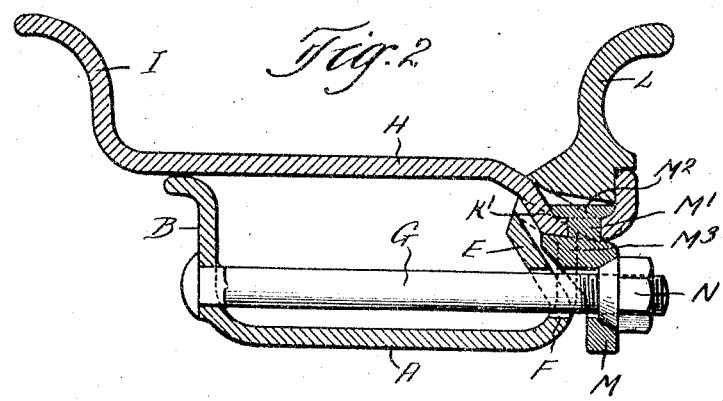
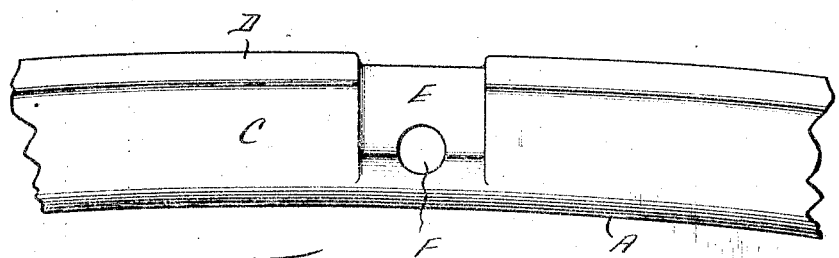
Inventor
J H Wagenhorst
By
Hull Brock & West
Attys Patented Apr. 13, 1926.

1,580,980

UNITED STATES PATENT OFFICE.

JAMES H. WAGENHORST, OF JACKSON, MICHIGAN.

DEMOUNTABLE RIM WITH DETACHABLE RING.

Application filed August 20, 1924. Serial No. 733,073.

*To all whom it may concern:*

Be it known that I, JAMES H. WAGENHORST, a citizen of the United States, residing at Jackson, in the county of Jackson and State of Michigan, have invented a certain new and useful Improvement in Demountable Rims with Detachable Rings, of which the following is a full, clear, and exact description, reference being had to the accompanying drawings.

This invention relates generally to automobile wheels and more particularly to the novel construction of the fixed rim of the wheel body and the demountable tire carrying rim usable in connection therewith.

One object of the invention is to provide a demountable tire carrying rim having a detachable side ring, said rim having clamping lugs permanently attached thereto at definite points, the front leg of the fixed rim being recessed or depressed to receive the clamping lugs and a portion of the demountable rim and thereby provide a driving connection between the fixed and demountable rims which will relieve to a considerable extent the strain upon the bolts and likewise the clamping lugs.

Other objects will become apparent as the description proceeds.

The invention consists in the novel features of construction hereinafter fully described and set forth in the appended claims.

In the drawings forming part of his specification, Fig. 1 is a sectional view of a fixed and a demountable tire carrying rim constructed in accordance with my invention, this section being taken at a point between two of the clamping lugs; Fig. 2 is a similar sectional view taken through one of the clamping lugs, the bolt and nut being shown in elevation; Fig. 3 is a side view showing a portion of the outer leg of the fixed rim.

In carrying out my invention, I employ a sheet metal fixed rim comprising a base portion A, rear leg B and front leg C, the front leg being formed with a rearwardly projecting inclined flange D which extends entirely around the fixed rim except at certain designated points where the front leg is pressed rearwardly as shown at E and in pressing this leg rearwardly at these points the flange D is caused to disappear as most clearly shown in Figs. 2 and 3. At the points where the front leg of the fixed rim is recessed or pressed rearwardly, I provide bolt openings F through which pass the axial bolts G, the rear ends being preferably formed with square shoulders fitting in square openings in the rear leg of the fixed rim. H indicates the demountable tire carrying rim which is formed at the rear side with a tire engaging flange I and at the front side is shaped to provide a groove K adapted to receive the detachable flange ring L. The grooved side of the demountable rim is adapted to contact with the flange D of the front leg of the fixed rim. The front leg of the fixed rim is of less width than the rear leg in order to permit the demountable rim to be easily placed upon and removed from the fixed rim. Clamping lugs M are permanently attached to the grooved side of the demountable rim at definite points, the grooved portion of the rim being apertured to receive the rivet lugs M' which are projected through the openings and headed down as indicated at M² and inasmuch as the base of the detachable flange ring does not extend into the bottom of the groove there will be ample space for producing a considerable head on the rivet. The clamping lug is formed with a considerable shoulder M³ which is upon each side of the rivet lug M' and contacts with a flattened portion of the grooved side of the rim base as most clearly shown in Fig. 2.

This shouldered portion of the clamping lug gives a firm bearing of the clamping lug upon the rim base and provides ample bearing for both the rim and clamping lug during the riveting operation so that a comparatively perfect union between the clamping lug and the grooved side of the rim base can be obtained. The rear portion of the clamping lug is so shaped as to fit within the recessed or impressed portion of the front leg of the felly and at the point where the clamping lug is attached, the grooved side of the demountable rim is pressed rearwardly as most clearly shown in Fig. 2 which inwardly pressed portion also fits into the recess in the front leg of the felly and in this manner the driving connection is established between the fixed and demountable rims and strains relieved from the bolt and also the clamping lug.

In applying the demountable rim to the fixed rim it will of course be understood that the apertured lugs fit upon the projecting ends of the bolts G and nuts N are screwed upon said projecting ends, these nuts being formed with tapered ends which fit into the counterbored bolt openings in the clamping lugs.

In this type of demountable rim with attached clamping lugs the bolts are disposed very close to the grooved portion of the rim base and consequently the pull of each bolt is transmitted in such a manner that the minimum amount of shearing strain is applied. Furthermore, due to the shouldered ends of the clamping lugs contacting firmly with the flattened portion of the grooved side of the rim base, rocking of the clamping lugs with reference to the demountable rim is practically avoided.

It will thus be seen that I provide a very durable and efficient construction of demountable tire carrying rim capable of use in connection with a channeled sheet metal fixed rim and capable of having a substantial driving connection therewith.

Having thus described my invention, what I claim is:—

1. In a wheel body, the combination with a fixed rim the front leg of which is flanged, said front leg being recessed at definite points and bolt openings produced in said rim at said recessed points, of bolts passing through the front leg of the fixed rim, a demountable tire carrying rim having a ring receiving groove at the front side, clamping lugs attached to the groove side of the rim at definite points, said clamping lugs being apertured to receiver the rim bolts, nuts upon the ends of said bolts, portions of said clamping lugs and portions of the grooved side of the rim base to which the clamping lugs are attached fitting into the recessed portions of the fixed rim.

2. The combination with a fixed rim having a flanged front leg, said flanged front leg being recessed at definite points and bolt openings produced in said front leg at said recessed points, of a demountable tire carrying rim having a ring receiving groove in the front side thereof, clamping lugs attached to the grooved side of said demountable rim, said clamping lugs having rivet portions projecting through the grooved portion of the rim base, said clamping lugs having shoulders adjacent said rivet portions, said shouldered portion contacting with the inner face of the grooved side of the demountable rim, bolts passing through the apertured leg of the fixed rim and through the clamping lugs attached to the demountable rim, nuts upon said bolts, portions of said clamping lugs fitting into the recessed portions of the front leg of the fixed rim.

3. The combination with a fixed rim having a flanged front leg, said flanged front leg being recessed at definite points, said front leg being apertured at said recessed points, of rim bolts passing through said apertures, a demountable tire carrying rim having a ring receiving groove at the front side thereof, said groove being apertured at definite points, clamping lugs having rivet portions projecting through the apertures in the grooved side of the demountable rim and headed down, said clamping lugs having shoulders adjacent the rivet portions contacting with the inner face of the grooved side of the demountable rim, said groove being pressed rearwardly at the points where the clamping lugs are attached to the demountable rim, said clamping lugs being apertured to receive the rim bolts, nuts upon the ends of said bolts, portions of the attached clamping lugs and the inpressed portions of the grooved side of the demountable rim engaging the recesses in the front leg of the fixed rim.

4. A demountable tire carrying rim having a tire retaining flange at the rear side thereof and a groove in the front side thereof to receive a detachable side ring, said groove being apertured at definite points, clamping lugs having rivet portions projecting through the apertures in the groove and headed down, said clamping lugs having shoulders contacting with the inner face of the grooved side of the demountable rim, said groove being pressed inwardly at the points where the clamping lugs are attached thereto, said clamping lugs having bolt receiving apertures.

5. The combination with a channeled fixed rim, the front leg of which is provided with an inclined flange, said front leg being recessed at definite points, of bolts passing through said leg at said points, a demountable rim having a tire engaging flange at the rear side and a groove at the outer side to receive a detachable flange ring, and lugs attached to said rim, said lugs having rivet portions extending through openings produced in the groove of the rim base, each lug comprising a radially extending apertured portion and a shouldered portion contacting with the inner face of the grooved portion of the rim base, a portion of each lug fitting into a recessed portion of the fixed rim and nuts upon the ends of said bolts.

In testimony whereof, I hereunto affix my signature.

JAMES H. WAGENHORST.